Sept. 4, 1956    A. C. STOVER    2,761,428
VALVE ASSEMBLY FOR A FLUID PRESSURE CONTROL SYSTEM
Original Filed Nov. 9, 1953    3 Sheets-Sheet 1
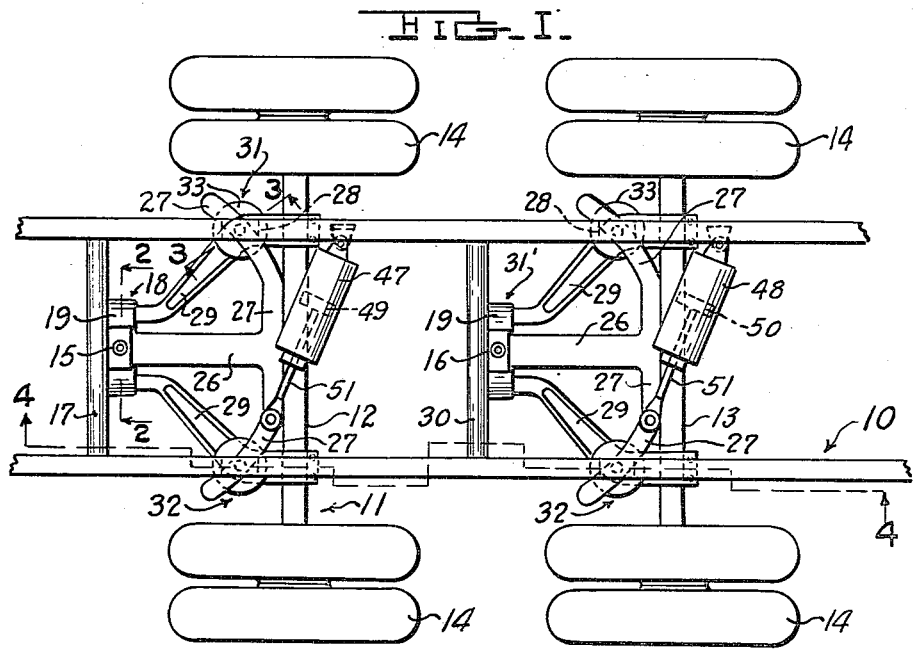
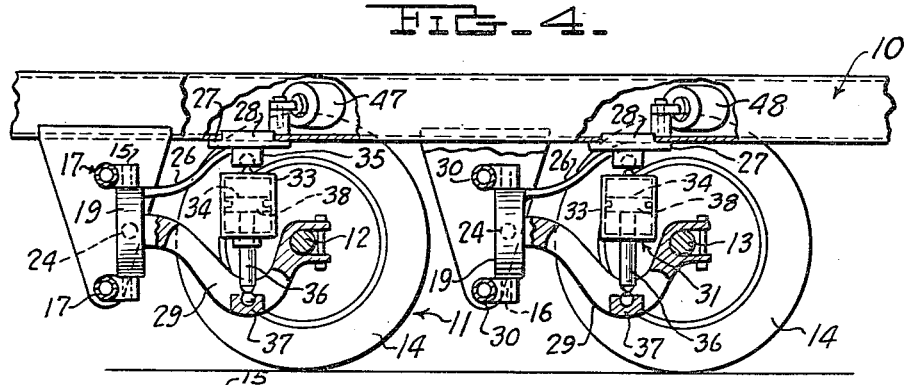
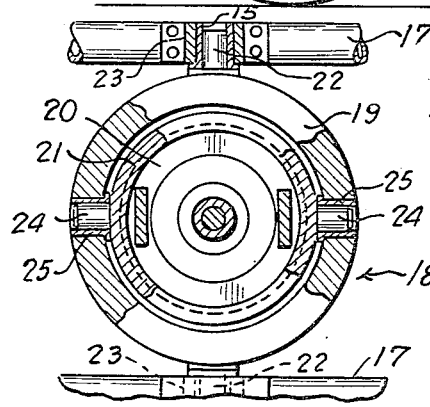
INVENTOR.
Ancil C. Stover
BY
Whittemore, Hulbert & Belknap
ATTORNEYS

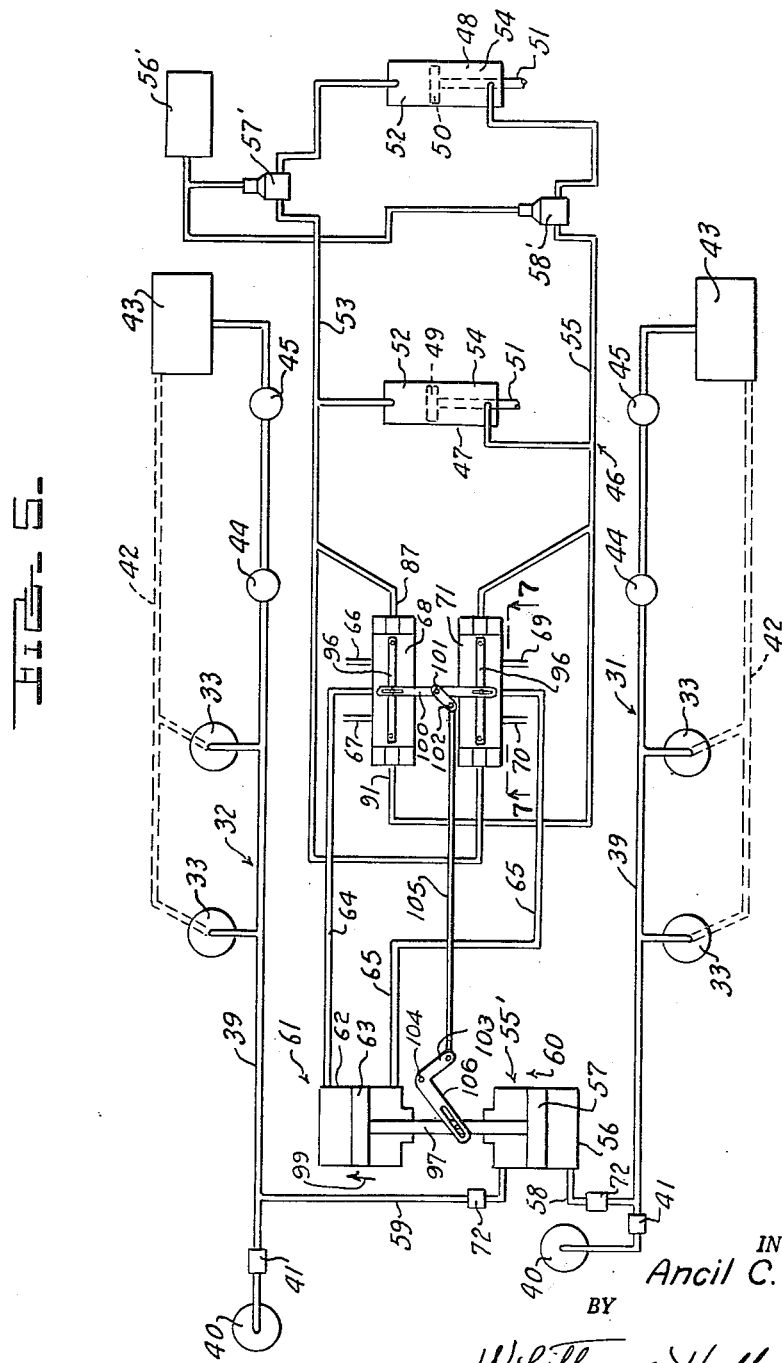

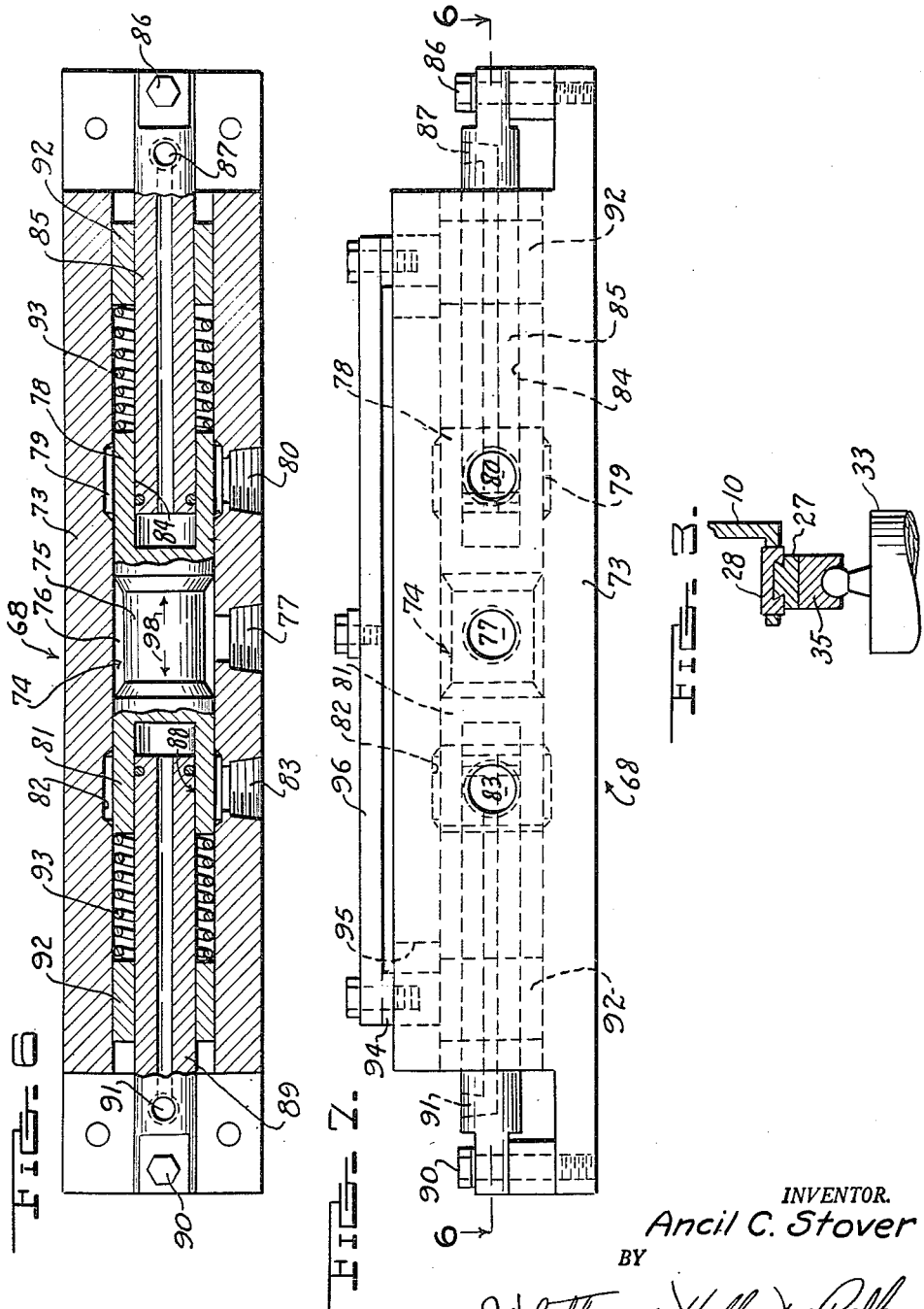

United States Patent Office 2,761,428
Patented Sept. 4, 1956

2,761,428

VALVE ASSEMBLY FOR A FLUID PRESSURE CONTROL SYSTEM

Ancil C. Stover, Louisville, Ky., assignor to William A. Eisenhauer, William P. Ellwood, Ida J. Eisenhauer, and Leigh E. Eisenhauer, doing business as The Eisenhauer Manufacturing Company, Van Wert, Ohio Original application November 9, 1953, Serial No. 390,896. Divided and this application January 4, 1954, Serial No. 401,949

12 Claims. (Cl. 121—41)

This invention relates generally to fluid pressure control systems and is a division of my copending application Serial Number 390,896, filed November 9, 1953.

It is an object of this invention to provide a fluid pressure control system having a valve assembly operated by a difference in pressure of fluid in opposite sides of a closed hydraulic displacement system for effecting displacement of fluid in one or more additional displacement systems.

It is another object of this invention to provide a control system of the above general type wherein the volumetric displacement in the one or more additional displacement systems is proportional to the difference in pressure existing in the closed hydraulic displacement system.

The foregoing as well as other objects will be made more apparent as this description proceeds especially when considered in connection with the accompanying drawings, wherein:

Figure 1 is a fragmentary semi-diagrammatic plan view of a vehicle embodying the features of this invention;

Figure 2 is an enlarged sectional view taken on the line 2—2 of Figure 1;

Figure 3 is a sectional view taken on the line 3—3 of Figure 1;

Figure 4 is a sectional view taken on the line 4—4 of Figure 1;

Figure 5 is a diagrammatic view of the hydraulic suspension and stabilizer systems embodied in the vehicle shown in Figure 1;

Figure 6 is a sectional view taken on the line 6—6 of Figure 7; and

Figure 7 is a side elevational view of the construction shown in Figure 6.

The present invention is shown for the purpose of illustration in connection with a vehicle having hydraulic suspension systems at opposite sides of the vehicle for supporting the sprung assembly on the unsprung assembly and having tandemly arranged turning axles controlled by a closed hydraulic stabilizing system. In accordance with this invention, the hydraulic stabilizing system is connected to the suspension systems in a manner such that differences in pressure in opposite sides of the hydraulic stabilizing system results in raising and lowering opposite sides of the sprung assembly of the vehicle to an extent proportional to the pressure difference existing in opposite sides of the stabilizing system.

The vehicle shown in the drawings comprises a sprung weight assembly in the form of a frame 10, and an unsprung weight assembly 11. The unsprung weight assembly 11 is shown in the present instance as having two tandemly arranged load carrying axles 12 and 13, although it will be understood as this description proceeds that additional load carrying axles may be provided if desired. In any case, each load carrying axle has ground engaging wheels 14 respectively supported on opposite ends thereof in the usual manner. It is to be further understood that the vehicle is equipped with steering wheels supported at the front end thereof in the usual manner to enable changing the course of travel of the vehicle to suit existing conditions. The steering wheels and operating mechanism therefor are not shown herein as they may be of any one of the various orthodox designs.

It will be apparent from the following description that the load carrying axles 12 and 13 are respectively supported for turning movement about substantially vertically extending axes 15 and 16 spaced equal distances forwardly from the respective axles midway between opposite ends of the latter to provide both axles with a caster effect. In other words, the axes about which the axles turn are so arranged that when the course of travel of the vehicle is changed by manipulation of the usual front steering wheels, the axles will turn in their appropriate directions throughout the required angle to conform the path of travel of the ground engaging wheels 14 to the steering pattern established by the direction of forward motion of the front end of the vehicle. It is important to note that the axles 12 and 13 are turned about their respective axes solely by the resultant lateral thrust developed at the points of ground engagement of the wheels 14.

With the above in view, reference is made more in detail to Figure 2 of the drawings showing the manner in which the front axle 12 is mounted on the frame 10. In detail, the reference numeral 17 indicates a cross member secured to the frame 10 in spaced relation to the axle 12 at the front side of the latter and the numeral 18 indicates the mounting for the axle 12 on the cross member 17. The mounting 18 comprises an outer ring 19, an inner ring 20, and an intermediate ring 21. The three rings are arranged in concentric relationship and are supported with their centers lying in substantially a common vertical plane with the longitudinal center line of the vehicle frame 10. The outer ring 19 is equipped with diametrically opposed vertically aligned trunnions 22 which establish the axis 15 of turning movement of the axle 12 and are journalled in bearings 23 supported by the cross member 17. The intermediate ring 21 has diametrically opposed horizontally aligned trunnions 24 which are respectively journaled in bearings 25 carried by the outer ring 19. The inner ring 20 is supported on the intermediate ring 21 for rotation about the axes of the rings.

The outer ring 19 has a suspension element 26 secured to the top thereof and projecting rearwardly toward the axle 12. The rear end of the element 26 is fashioned with laterally outwardly extending parts 27 having the outer ends respectively positioned below the opposite side rails of the frame 10. The outer extremities of the parts 27 are curved in concentric relationship to the axis 15 and are slidably supported on the frame 10 by guides 28 as shown in Figure 3 of the drawings.

The inner rotatable ring 20 is connected to the axle 12 adjacent opposite end portions of the latter by a pair of arms 29. The arms 29 project rearwardly from diametrically opposite sides of the inner ring 20 and are secured at the rear ends to the axle 12. Inasmuch as the inner ring 20 is rotatable about its axis relative to the rings 19 and 21, it follows that the axle 12 may tilt freely in a vertical plane to conform to uneven road conditions. Also, since the intermediate ring 21 is free to pivot about a horizontal axis, it follows that the axle 12 may also be moved in an up and down direction relative to the frame 10. Moreover, since the trunnions 22 allow pivotal movement of the outer ring 19 about the vertical axis 15, it follows that the axle 12 may turn freely about this axis.

In the present instance the axle 13 is supported on a second cross member 30 of the frame 10 by a mounting 31'. The mounting 37' is identical to the mounting 18 and corresponding parts are designated by the same reference numerals. Thus, both axles 12 and 13 have the freedom of movement relative to the frame 10 required to not only provide optimum riding characteristics under practically all road conditions but in addition to enable the axles to conform to the steering pattern of the vehicle when the course of travel of the latter is changed.

In the present instance, the sprung weight assembly is supported hydraulically on the unsprung weight assembly and for accomplishing this result two hydraulic suspension systems 31 and 32 are provided at opposite sides of the vehicle. The hydraulic suspension system 31 at one side of the vericle comprises a pair of vertically extending cylinders 33 and pistons 34 respectively slidably mounted in the cylinders 33. As shown particularly in Figure 4 of the drawings, the upper ends of the cylinders 33 are respectively mounted on the adjacent parts 27 of the mountings 18 and 31' by universal couplings 35 so that the cylinders may have in effect a pivotal movement in all directions relative to the respective mountings. The pistons 34 in the respective cylinders 33 have connecting rods 36 which extend downwardly through the bottom walls of the cylinders 33 and are respectively mounted on the adjacent arms 29 of the mountings 18 and 31' by universal couplings 37. As a result, the pistons 34 may assume the same relattive positions as the cylinders 33 without any danger of binding of the parts.

The variable volume spaces in the cylinder 33 above the pistons 34 are sealed from the variable volume spaces in the cylinder 33 below the pistons 34 by annular seals 38 carried by the respective pistons and engageable with the inner surfaces of the cylinders. The variable volume spaces in the cylinders 33 above the pistons 34 are connected together by a fluid line 39 which in turn is connected to a source of fluid under pressure 40 through the medium of a check valve controlled by-pass 41. The source of fluid under pressure 40 may be in the form of a hydraulic accumulator having provision for supplying a relatively non-compressible fluid to the variable volume spaces in the cylinders 33 above the pistons 34.

The variable volume spaces in the cylinders 33 below the pistons 34 are connected together by a fluid conduit 42 which in turn is connected to a reservoir 43 below the level of the fluid therein. The reservoir 43 is preferably of the type wherein the fluid contained therein is under atmospheric pressure, although a pressurized reservoir may be used if desired.

The conduit 39 is also shown in Figure 5 of the drawings as connected to the reservoir 43 through a shut-off valve 44 and a pump 45. The purpose of this arrangement is to permit replenishing the variable volume spaces in the cylinders 33 above the pistons 34 with fluid from the reservoir to compensate for leakage of fluid past the piston seals 38.

The hydraulic suspension system 32 at the opposite side of the vehicle is identical to the system 31 previously described and the same reference numerals are used to designate corresponding parts. It follows from the above that the sprung weight assembly of the vehicle is supported by vertical columns of a non-compressible fluid contained in the variable volume spaces in the cylinders 33 of both systems above the pistons 34 in the respective cylinders.

It has previously been stated that the load carrying axles are mounted to enable these axles to turn in the appropriate directions and throughout the required angle to enable the ground engaging wheels to conform to the steering pattern of the vehicle. It has also been stated that the axles are turned about their respective axes 15 and 16 by a lateral thrust imparted to the ground engaging wheels as a result of changing the course of travel of the vehicle by manipulating the steering wheels. While this arrangement greatly improves the maneuverability of the vehicle, nevertheless, it also tends to detract from the stability of the vehicle under certain conditions of operation. For example, the centrifugal force which naturally results when the forward motion of the vehicle is changed in one direction or the other, also imparts a lateral thrust upon the ground engaging wheels which could greatly exceed the normal steering forces. The reaction of such centrifugal forces tends to cause both the load carrying axles to turn in the same direction or, in other words, to turn toward the outside of the curve being negotiated by the vehicle. If the external forces opposing the normal steering forces are great enough it is possible that the rear end of the vehicle would actually run off the road surface at the outside of the curve. In any case, directional stability of the vehicle would be grossly impaired.

In order to overcome the foregoing objection and at the same time enable the ground engaging wheels on the load carrying axles to conform to the steering pattern of the vehicle, a hydraulic stabilizing system 46 is provided. The system 46 comprises a pair of double acting hydraulic cylinders 47 and 48 respectively having pistons 49 and 50 slidably supported therein. As shown in Figure 1 of the drawings, one end of the cylinder 47 is pivoted on the frame 10 adjacent the axle 12 and the corresponding end of the cylinder 48 is pivoted on the frame 10 adjacent the axle 13. The pistons have connecting rods 51 which respectively extend through the opposite ends of the cylinders and are respectively pivotally connected to the suspension members 26 of the mountings 18 and 31'. The arrangement is such that the pistons 49 and 50 are moved relative to the cylinders 47 and 48 in response to turning movement of the axles 12 and 13.

As shown in Figure 5 of the drawings the variable volume spaces 52 at one side of the pistons in the stabilizer cylinders are connected together by a fluid conduit 53 and the variable volume spaces 54 at the opposite sides of the pistons in the stabilizer cylinders are connected together by the conduit 55. The conduit 53 is also connected to a pressurized reservoir 56' through the medium of an aspirating valve 57' and the conduit 55 is connected to the same reservoir 56' through the medium of a second aspirating valve 58'. The reservoir 56' and aspirating valves 57' and 58' are shown in detail in my copending application, Serial No. 327,231 filed December 22, 1952. The stabilizing cylinders as well as the fluid connections therebetween are filled with a relatively non-compressible fluid medium and air pockets are eliminated from the systems by the aspirating valves. Thus, turning movement of the axles caused by normal steering thrusts imparted to the road engaging wheels on the axles when the course of travel of the vehicle is changed causes a displacement of the hydraulic fluid medium in the stabilizing system so that the axles may turn in the appropriate directions and throughout the angle required for the axles to follow the steering pattern of the vehicle. However, it is clear that the stabilizing system would resist any external force opposing the normal steering thrusts and tending to turn the axles in the same direction, for example. Such opposing forces would produce a difference in pressure in opposite sides of the stabilizing system and this difference in pressure is employed herein for the purpose of shifting the center of gravity of the load on the vehicle to compensate for the effect of the centrifugal force resulting from turning the vehicle at relatively high speeds.

With the above in view, reference is again made to Figure 5 of the drawings wherein it will be noted that the reference numeral 55' designates a control device comprising a cylinder 56 and a piston 57 slidably supported in the cylinder 56. The variable volume space in the cylinder 56 at one side of the piston 57 is connected by a conduit 58 to the supply conduit 39 of the suspension system 31, and the variable volume space at the opposite side of the piston 57 in the cylinder 56 is connected by a conduit 59 to the supply conduit 39 of the suspension system 32. The variable volume spaces in the cylinder 56 are filled with a relatively non-compressible hydraulic fluid medium so that movement of the piston 57 in the direction of the arrow 60 introduces a volume of fluid into the upper ends of the cylinders 33 of the suspension system 32 and withdraws fluid from the upper ends of the cylinders 33 of the suspension system 31. Thus, the side of the frame 10 at which the suspension system 32 is located is raised and the opposite side of the frame is lowered. Of course, movement of the piston 57 in the control cylinder 56 in the opposite direction reverses the above operation so that the side of the frame at which the suspension 31 is located is raised and the opposite side of the frame is correspondingly lowered.

The piston 57 in the control cylinder 56 is operated by a power device 61 comprising a double acting cylinder 62 and a piston 63 slidably supported in the cylinder. The space in the cylinder 62 at one side of the piston 63 is connected to a conduit 64 and the space in the cylinder 62 at the opposite side of the piston 63 is connected to a conduit 65. The conduit 64 is alternately connected to a source of fluid under pressure 66 and an exhaust 67 through the medium of a valve 68. The conduit 65 is alternately connected to a source of fluid under pressure 69 and an exhaust 70 through a valve 71. As will be presently set forth, the valves 68 and 71 are operated by differences in pressure in opposite sides of the hydraulic stabilizing system 46. Thus, when a differential pressure exists in opposite sides of the stabilizing system 46, the power piston 63 is operated by fluid under pressure to in turn actuate the control device 55'. The fluid under pressure employed to actuate the power piston 63 is preferably pneumatic and may be supplied from any suitable source.

As shown in Figure 5 of the drawings, a pressure sensitive shut off valve 72 is located in each of the conduits 58 and 59. The purpose of these valves is to close the hydraulic suspension systems whenever the fluid pressure in the power device 61 drops below a predetermined value. In addition, the valves 72 provide a variable flow control from one suspension system to the other so that the reaction to the pressure differential in the stabilizing system will not be too rapid and cause "hunting" of the system.

The valves 68 and 71 are identical in construction and the valve 68 is shown in detail in Figures 6 and 7 of the drawings. The valve 68 comprises an elongated casing 73 and a spool 74 slidably mounted in the casing intermediate the ends thereof. The central portion 75 of the spool 74 is reduced in diameter to provide an annular space 76 within the casing and this space communicates with a port 77 which in turn communicates with the conduit 64. The interior of the casing 73 is enlarged opposite the end 78 of the spool to provide an annular space 79 which communicates with the source of fluid under pressure 66 through a port 80. Also the interior of the casing 73 is enlarged opposite the other end 81 of the spool 74 to provide an annular space 82 which communicates with a port 83 connected to the exhaust 67.

The end 78 of the spool 74 has an axially extending bore 84 for slidably receiving a tubular member 85 having the outer end projecting beyond the adjacent end of the valve casing and secured thereto by a fastener element 86. An intake port 87 is formed in the outer end portion of the tube 85 and is connected to the conduit 53 of the stabilizing system 46.

The opposite end 81 of the spool 74 is formed with an axially extending bore 88 for slidably receiving the inner end of a tube 89 having the outer end projecting beyond the corresponding end of the valve casing 73 and secured thereto by a fastener 90. An intake port 91 is formed in the outer end portion of the tube 89 and is connected to the conduit 55 forming the opposite side of the stabilizing system 46.

Slidably mounted within each end of the valve casing 73 is a sleeve 92. The sleeves 92 are respectively spaced axially from opposite ends of the spool 74 by coil springs 93 respectively surrounding the tubes between the sleeves 92 and adjacent ends of the spool 74. As shown in Figure 7 of the drawings, the sleeves 92 have projections 94 which extend through slots 95 formed in the valve casing and are connected together by linkage 96. The linkage 96 is also connected to a rod 97 which connects the power piston 63 to the control piston 57 in a manner to be more fully hereinafter described. The valve 71 is identical in construction to the valve 68 previously described and the same reference numerals are used as to designate corresponding parts. The intake port 87 of the valve 71, however, is connected to the conduit 55 of the hydraulic suspension system 46, and the intake port 91 of the valve 71 is connected to the conduit 53 of the hydraulic suspension system 46. Also, the port 77 in the valve casing 73 of the valve 71 is connected to the conduit 65 and the linkage 96 interconnecting the sleeves 92 of the latter valve is also connected to the rod 97 for reasons to be presently described.

It follows from the above that when the pressure in the conduit or side 53 of the hydraulic stabilizing system 46 becomes greater than the pressure in the opposite side or conduit 55 of this stabilizing system, fluid under pressure enters the intake port 87 in the valve 68 and flows through the tube 85 into the bore 84 at the end 78 of the spool 74. Since the intake port 91 of the valve 68 is connected to the side 55 of the stabilizing system 46 wherein the pressure is somewhat lower, it follows that the spool 74 of the valve 68 is moved to the left as viewed in Figure 6 against the action of the spring 93 adjacent the end 81 of the spool 74 to connect the exhaust port 83 of the valve 68 to the port 77. Thus, the conduit 64 connected to the powder cylinder 62 is exhausted. At the same time fluid under pressure from the conduit 53 of the stabilizing system 46 is introduced into the intake port 91 of the valve 71 causing the spool 74 in the latter valve to move in the opposite direction against the action of the spring 93 adjacent the end 78 of the spool 74. As a result the source of fluid under pressure 69 is connected to the port 77 of the valve 71 and fluid under pressure flows through the conduit 65 into the end of the power cylinder 62 opposite the end connected to the exhaust by the conduit 64. Thus, the piston 63 in the power cylinder 62 is moved in the direction of the arrow 99 (Figure 5) and the control device 55' is operated to introduce fluid into the upper ends of the cylinders 33 of the suspension system 32 and withdraw a corresponding volume of fluid from the upper ends of the cylinders 33 of the suspension system 31.

It is apparent from the foregoing that when the pressure in the side or conduit 55 of the stabilizing system 46 becomes greater than the pressure in the opposite side or conduit 53, the valves will operate to reverse the action of the power device 61 and control device 55'. In other words, when this latter condition exists hydraulic fluid medium is displaced into the upper ends of the cylinders 33 of the suspension system 31 and is withdrawn from the upper ends of the cylinders 33 of the suspension system 32.

It has previously been stated that the sleeves 92 of each valve are connected together and to the actuating rod 97 for the control device 55'. In this connection attention is again directed to Figure 5 of the drawings wherein it will be noted that a link 100 is secured intermediate the ends thereof to a shaft 101 which is suitably supported for rotation and has a lever 102 secured thereto. The opposite ends of the link 100 are respectively pivotally connected to the linkage 96 associated with the respective valves 68 and 71. The free end of the lever 102 is connected to one arm 103 of a bell crank 104 by a link 105 and the other arm 106 of the bell crank is connected to the piston rod 97.

Assuming that for one reason or another the pressure in the side 55 of the stabilizing system 46 becomes greater than the pressure in the side 53, it will be noted that the valve spool 75 in the valve 68 is moved from the position thereof shown in Figure 6 to a position wherein the port 77 is connected to the pressure line 66 through the port 80. Also it will be noted that the valve spool 75 in the valve 71 is moved in the opposite direction from its central position to connect the port 77 with the exhaust line 70 through the port 83. As a result the power piston 63 is moved downwardly in the cylinder 62 and the control piston 57 is moved in a corresponding direction in the cylinder 56. Hence, hydraulic fluid is displaced from the suspension system 32 into the cylinder 56 and hydraulic fluid is displaced from the cylinder 56 into the suspension system 31 so that one side of the sprung assembly of the vehicle is raised and the opposite side is lowered. It will further be noted that due to the connection between the piston rod 97 and the bell crank 104, the sleeves 92 in both valves are respectively moved as a unit in opposition to the valve spools 75 so that the forces exerted by the springs 93 and resisting movement of the spools, by the increased pressure in the side 55 of the stabilizing system 46, are progressively increased as the extent of movement of the piston rod 97 increases. The same results are obtained in cases where the pressure in the side 53 of the stabilizing system 46 exceeds the pressure in the side 55 of the stabilizing system. Therefore, the range of volumetric displacement in the suspension systems 31 and 32 is proportional to the differences in pressure existing in opposite sides of the stabilizing system 46. It is to be understood that the mechanical linkage connecting the piston rod 97 to the respective links 96 of the valves 68 and 71 is so adjusted that the valve spools will assume their neutral positions shown in Figure 6 when the forces within the valves are balanced.

What I claim as my invention is:

1. In a fluid pressure control system, a valve assembly comprising a casing having an elongated chamber and having intake and outlet ports communicating with the chamber at points spaced from one another lengthwise of the chamber, a valve member supported within the chamber for sliding movement and having a reduced portion intermediate the ends thereof registrable with the outlet port in one position of the valve member in said chamber, said valve member also having a head portion adjacent the reduced portion registrable with the intake port to close the latter when the valve member is in the one position aforesaid, means for introducing fluid under pressure into the chamber at the end of the valve member opposite said head portion for moving the valve member in a direction to connect the intake and outlet ports, a spring housed in the chamber and acting on the valve member to oppose movement of said valve member by the fluid under pressure, an abutment for the spring supported in the chamber for movement toward and away from the valve member, and means operable upon connecting the intake port with the outlet port to move the abutment toward the valve member and thereby increase the opposing force exerted by the spring on the valve member.

2. In a fluid pressure control system, a relatively movable piston and cylinder, a valve assembly comprising an elongated chamber having an inlet port for fluid under pressure and having an outlet port connected to the cylinder at one side of the piston, a valve member supported within the chamber for sliding movement and closing communication between said ports in one position relative to the chamber, said valve member having means for connecting the ports upon movement in one direction from the position aforesaid, means for introducing fluid under pressure into the chamber at one end of the valve member for moving the latter in said one direction, a coil spring supported within the chamber and having one end engaging the valve member to oppose movement of the valve member in said one direction by the fluid under pressure, an abutment slidably supported in the chamber and engageable with the opposite end of the coil spring, and means operated by relative movement of the piston and cylinder for moving the abutment in a direction toward the valve member to increase the opposing force applied to the valve member by said spring.

3. In a fluid pressure control system a valve assembly comprising a casing having an elongated chamber and having intake and exhaust ports communicating with the chamber at points spaced from each other lengthwise of the chamber, a fluid outlet opening communicating with the chamber at a point between the intake and exhaust ports, a valve member supported within the chamber for sliding movement and having a reduced portion intermediate the ends registrable with the outlet opening in one position of the valve member in said chamber, said valve member also having head portions at opposite ends of the reduced portion respectively registrable with the intake and exhaust ports to close the latter when the valve member is in the one position aforesaid, the reduced portion having a length predetermined to alternately connect the outlet opening with the intake and exhaust ports upon movement of the valve member in opposite directions in said chamber from the one position aforesaid, spring means acting on opposite ends of the valve member for yieldably holding the valve member in the one position aforesaid, means for alternately introducing fluid under pressure into the chamber at opposite ends of the valve member for moving the latter in opposite directions against the action of the spring means, and means responsive to the connecting of the outlet opening with the intake port upon movement of said valve member in one direction for progressively increasing the force exerted by the spring means resisting movement of the valve member in the last named direction by the fluid under pressure.

4. In a fluid pressure control system, a valve assembly comprising a casing having an elongated chamber and having intake and exhaust ports communicating with the chamber at points spaced from each other lengthwise of the chamber, a fluid outlet opening communicating with the chamber at a point between the intake and exhaust ports, a valve member supported within the chamber for sliding movement and having a reduced portion intermediate the ends registrable with the outlet opening in one position of the valve member in said chamber, said valve member also having head portions at opposite ends of the reduced portion respectively registrable with the intake and exhaust ports to close the latter when the valve member is in the one position aforesaid, the reduced portion having a length predetermined to alternately connect the outlet opening with the intake and exhaust ports upon movement of the valve member in opposite directions in said chamber from the one position aforesaid, coil springs supported within the chamber at opposite ends of the valve member and having the inner eends respectively engaging opposite ends of the valve member to oppose movement of said valve member from the one position aforesaid, abutments slidably supported within the chamber in positions to respectively engage the outer ends of the coil springs, means for alternately introducing fluid under pressure into said chamber at opposite ends of said valve member for moving the latter in opposite directions against the action of said springs, and means for moving the abutments in opposition to the movement of said valve member upon connecting the outlet opening with either of said ports.

5. In a fluid pressure control system, a relatively movable piston and cylinder, a valve assembly comprising an elongated chamber having intake and exhaust ports spaced from each other lengthwise of the chamber, an opening communicating with the chamber between said ports and connected to the cylinder at one side of the piston, a valve member supported within the chamber for sliding movement lengthwise of the latter and having a reduced portion intermediate the ends registrable with said opening in one position of the valve member in said chamber, said valve member also having head portions at opposite ends of the reduced portion respectively registrable with the intake and exhaust ports to close the latter when the valve member is in the position aforesaid, the reduced portion of the valve member having a length predetermined to alternately connect the opening with the intake and exhaust ports upon movement of the valve member in opposite directions in the chamber from the one position aforesaid, means yieldably opposing movement of the valve member in opposite directions from the one position of the valve member aforesaid, means for alternately introducing fluid under pressure into the chamber at opposite ends of the valve member for moving the latter against the action of said opposing means, and means for increasing the force opposing movement of the valve member by the action of the fluid pressure in proportion to the extent of relative movement of the piston and cylinder.

6. In a fluid pressure control system, a relatively movable piston and cylinder, a valve assembly comprising an elongated chamber having intake and exhaust ports spaced from each other lengthwise of the chamber, an opening communicating with the chamber between said ports and connected to the cylinder at one side of the piston, a valve member supported within the chamber for sliding movement lengthwise of the latter and having a reduced portion intermediate the ends registrable with said opening in one position of the valve member in said chamber, said valve member also having head portions at opposite ends of the reduced portion respectively registrable with the intake and exhaust ports to close the latter when the valve member is in the position aforesaid, the reduced portion of the valve member having a length predetermined to alternately connect the opening with the intake and exhaust ports upon movement of the valve member in opposite directions in the chamber from the one position aforesaid, coil springs supported within the chamber at opposite ends of the valve member and having the inner ends respectively engageable with opposite ends of the valve member to oppose movement of said valve member from the position aforesaid, abutments slidably supported within the chamber in positions to respectively engage the outer ends of the coil springs, means for alternately introducing fluid under pressure into said chamber at opposite ends of said valve member for moving the latter against the action of said springs, and means operated by relative movement of the cylinder and piston for moving the abutments as a unit in a direction opposite the direction of movement of the valve member.

7. In a fluid pressure control system, a valve assembly comprising a casing having an elongated chamber and having inlet and exhaust ports communicating with the chamber at points spaced from each other lengthwise of said chamber, a fluid opening communicating with said chamber at a point spaced from said inlet and exhaust ports, a valve member supported within said chamber for sliding movement lengthwise of said chamber and closing communication between said ports and said opening in one position of said valve member in said chamber, said valve member having means for alternately connecting said opening with said inlet and exhaust ports upon movement of said valve member in opposite directions in said chamber from said one position, resilient means acting on opposite ends of said valve member for yieldably holding said valve member in said one position, means for alternately introducing fluid under pressure into said chamber at opposite ends of said valve member for moving the latter in opposite directions against the action of said resilient means, and means responsive to the connecting of said opening with one of said ports upon movement of said valve member in either direction from said one position for progressively increasing the force exerted by said resilient means resisting movement of said valve member from said one position.

8. In a fluid pressure control system, a valve assembly comprising a casing having a chamber and having inlet and exhaust ports communicating with said chamber at spaced points, a fluid opening communicating with said chamber at a point spaced from said ports, a valve member supported within said chamber for sliding movement and closing communication between said ports and said opening in one position of said valve member in said chamber, said valve member having means for alternately connecting said opening with said inlet and exhaust ports upon movement of said valve member in opposite directions in said chamber from said one position, resilient means for yieldably holding said valve member in said one position, means for moving said valve member in opposite directions against the action of said resilient means, and means responsive to the connecting of said opening with one of said ports upon movement of said valve member in either direction from said one position for progressively increasing the force exerted by said resilient means resisting movement of said valve member from said one position.

9. In a fluid pressure control system, a relatively movable piston and cylinder, a valve assembly comprising an elongated chamber and having inlet and exhaust ports communicating with said chamber at points spaced from each other lengthwise of said chamber, a fluid opening communicating with said chamber at a point spaced from said ports, a valve member supported within said chamber for sliding movement lengthwise of the latter and closing communication between said ports and said opening in one position of said valve member, said valve member having means for alternately connecting said opening with said inlet and exhaust ports upon movement of said valve member in opposite directions from said one position, means yieldably opposing movement of said valve member in opposite directions from the one position of the valve member aforesaid, means for alternately introducing fluid under pressure into the chamber at opposite ends of the valve member for moving the latter against the action of said opposing means, and means for increasing the force opposing movement of the valve member by the action of the fluid pressure in proportion to the extent of relative movement of the piston and cylinder.

10. In a fluid pressure control system, a valve assembly comprising a casing having an elongated chamber and having inlet and outlet ports communicating with said chamber at spaced points, a fluid opening communicating with said chamber at a point spaced from said ports, a valve member supported within said chamber for sliding movement lengthwise of said chamber and closing communication between said ports and said opening in one position of said valve member, said valve member having means for alternately connecting said opening with said inlet port and said exhaust port upon movement of said valve member in opposite directions from said one position, springs supported within said chamber at opposite ends of said valve member and having the inner ends respectively engaging the opposite ends of said valve member to oppose movement of said valve member from said one position, abutments slidably supported within said chamber in positions to respectively engage the outer ends of said springs, means for moving said valve member in opposite directions against the action of said springs, and means for moving said abutments in opposition to the movement of said valve member upon connecting the outlet opening with either of said ports.

11. In a fluid pressure control system, a relatively movable piston and cylinder, a valve assembly comprising an elongated chamber having inlet and outlet ports communicating with said chamber at spaced points, a fluid opening communicating with said chamber at a point spaced from said ports and connected to the cylinder at one side of the piston, a valve member supported within said chamber for sliding movement lengthwise of said chamber and closing communication between said ports and said opening in one position of said valve member, said valve member having means for alternately connecting said opening with said inlet port and said exhaust port upon movement of said valve member in opposite directions from said one position, springs supported within said chamber at opposite ends of said valve member and having the inner ends respectively engaging the opposite ends of said valve member to oppose movement of said valve member from said one position, abutments slidably supported within said chamber in positions to respectively engage the outer ends of said springs, means for moving the said valve member in opposite directions against the action of said springs, and means operated by relative movement of the cylinder and piston for moving said abutments in a direction opposite to the direction of movement of said valve member.

12. Structure as defined in claim 11 in which said means for moving said valve member in opposite directions comprises means for introducing fluid under pressure to said chamber at opposite ends of said valve member.

References Cited in the file of this patent

UNITED STATES PATENTS

| | | |
|---|---|---|
| 2,233,319 | Lozivit | Feb. 25, 1941 |
| 2,291,048 | Lichtenstein | July 28, 1942 |
| 2,376,671 | Dodson | May 22, 1945 |
| 2,536,965 | Taylor | Jan. 2, 1951 |
| 2,667,150 | Coar | Jan. 26, 1954 |

FOREIGN PATENTS

| | | |
|---|---|---|
| 575,899 | Great Britain | Mar. 11, 1946 |
| 61,046 | Netherlands | May 15, 1948 |